May 23, 1961 W. E. SCHOBER 2,985,723

TAPE RECORDER HEAD MOUNTING

Filed Sept. 14, 1956

INVENTOR
WAYNE E. SCHOBER

Williamson, Schroeder, Adams & Meyers
ATTORNEYS 2,985,723

TAPE RECORDER HEAD MOUNTING

Wayne E. Schober, Minneapolis, Minn., assignor, by mesne assignments, to Viking of Minneapolis, Inc., Minneapolis, Minn., a corporation of Minnesota Filed Sept. 14, 1956, Ser. No. 609,945

3 Claims. (Cl. 179—100.2)

This invention relates to sound recording and playback machines of the general type employing elongated magnetic record elements such as magnetic tapes and the like, and more specifically relates to apparatus in such a machine for the mounting of electromagnetic transducer heads over which the record element is moved.

This application comprises a continuation-in-part of my copending application filed August 10, 1955, and entitled Tape Recording and Playing Machine, S.N. 527,593, now abandoned.

Such machines may be used in a great number of ways with different head arrangements. Of course such a machine may be used for recording and playing, and with a slightly modified arrangement, may be used to "erase" the record as the record approaches the recording head. Binaural and trinaural recording and playing systems may require that a number of heads be used for respective cooperation with several juxtaposed tracks on the tapes.

An object of my invention is to provide in a rceording and playing machine, new and improved apparatus of simple and inexpensive construction and operation for mounting transducer heads and for facilitating ready and easy interchanging of the head arrangement.

Another object of my invention is the provision in a recording and playing machine of novel apparatus for quickly mounting transducer heads in different predetermined arrangements in accordance with the functions that the machine is to perform.

These and other objects and advantages of my invention will more fully appear from the following description made in connection with the accompanying drawings wherein like reference characters refer to the same parts throughout the several views and in which.

Figure 1:
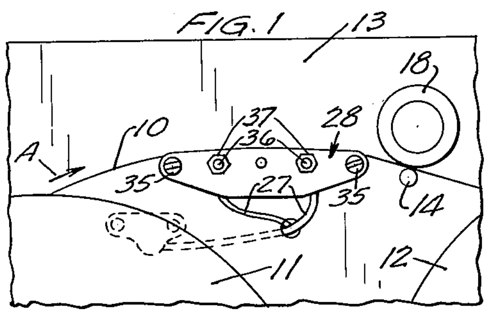
Fig. 1 is a front elevation view of the head mounting comprising the present invention and shown attached to the frame of a sound reproducing machine of which a portion is broken away.

The sound reproducing machine shown in the drawings is a substantially conventionally styled tape recorder and player and employs a magnetic type recording tape 10 which is carried on and longitudinally moved by reels 11 and 12, and in the form shown, the magnetic recording tape 10 will be moved in the direction of arrow A from reel 11 to reel 12 when sound indications are transmitted to and from the tape in recording and playing respectively. The reels 11 and 12 are carried on the frame 13, which in the form shown, comprise a flat plate, behind which the amplifying and other electrical switching mechanism will be mounted. Means are provided for driving the tape in the direction of arrow A at a predetermined rate and in the form shown, a capstan 14 is journalled in the frame and is connected with a flywheel 15 which is powered by motor 16 and which is connected to the motor by means of a belt 17. The pressure roller 18 engages the tape 10 passing over the capstan 14 and maintains the tape in driving engagement with the capstan.

The head mounting includes a pair of mounting posts 19 and 20 which are affixed by any suitable means to the frame 13 and are disposed in spaced relation with respect to each other and on the same side of the tape 10, permitting the tape to pass thereover. In the form shown, the inner ends of posts 19 and 20 are provided with threaded lugs 21 which extend through suitable apertures in the frame 13 and are secured therein by nuts 22. Intermediate the post ends, annular tape-guiding recesses 23 and 24 are formed. The recesses 23 and 24 are in alignment with each other and in alignment with the tape 10 passing between the reels 11 and 12 and over the capstan 14.

Means are provided for securing electromagnetic transducer heads 25 between the posts 19 and 20 and in operative relation with the magnetic record tape carried in the recesses 23 and 24. Where, herein, electromagnetic transducer heads are referred to this expression is expressly meant to include electromagnetic transducer heads of various sorts including recording heads, playing heads, erasing heads and the like. The electromagnetic transducer heads 25 are provided with electromagnetic elements 26 which are connected by means of conductors 27 to suitable amplifying and control apparatus (not shown) in the sound reproducing machine. The present invention includes the provision of a plurality of head-mounting plates 28, 29 and 30 which are separately shown in the different figures of the drawings and which are interchangeably securable on the outer ends of posts 19 and 20. The different head mounting plates 28, 29 and 30 are formed for mounting the transmitting heads in different positions so as to adapt the sound reproducing machine for use with recording tapes of different types or for different uses.

Figure 2:
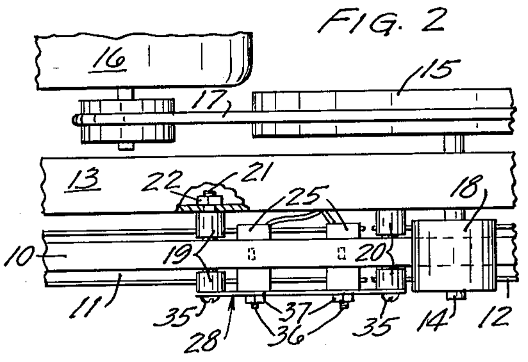
Fig. 2 is a detail plan view of a portion of a sound reproducing machine and showing the head mounting in top plan.
Figure 3:
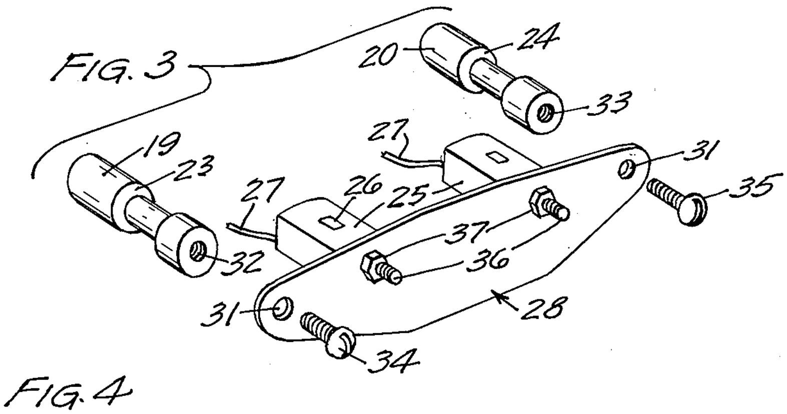
Fig. 3 is an exploded perspective view of the head mounting.

The form shown in Figs. 1, 2 and 3 is primarily adapted for use with a recording tape having a single track of magnetic material thereon which may cover substantially the entire width of the tape. Mounting plate 28 is constructed of rigid sheet material such as steel and is provided with apertures 31 at the opposite ends thereof to facilitate mounting of the plate upon the outer ends of posts 19 and 20 which are drilled and tapped at 32 and 33. Removable securing means are provided for attaching the mounting plate 28 to the outer ends of posts 19 and 20 and in the form shown, such means include a pair of securing screws 34 and 35 which are respectively insertable through the apertures 31 of the plate 28 and threadable into the tapped apertures 32 and 33 in the post. The heads 25 are provided with threaded lugs 36 which extend through suitably provided apertures in plate 28 and are secured therein by nuts 37. As best seen in Fig. 3, the mounting plate 28 along with the heads 25 may be readily and easily removed from the recording machine by merely removing the screws 34 and 35 from the posts 19 and 20 to permit a different mounting plate to be quickly applied to the machine for applying different heads to the machine or for applying heads to the machine in a different arrangement. Of course the conductors 27 may be removably connected to the amplifying and control apparatus by suitable jacks or plugs (not shown).

Figure 4:
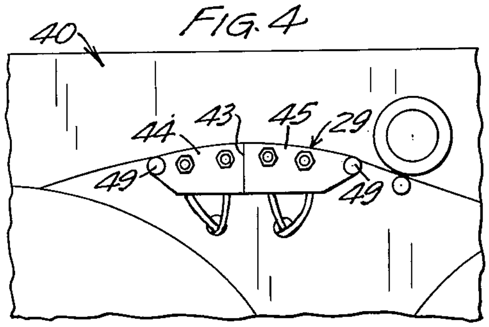
Fig. 4 is a detail elevation view of a portion of a sound reproducing machine having a modified form of the head mounting thereon.
Figure 5:
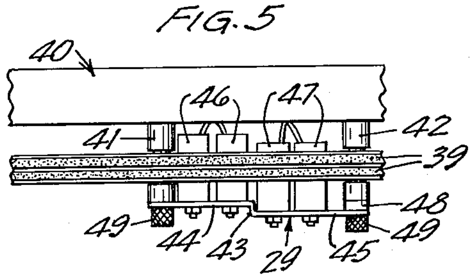
Fig. 5 is a detail plan view of a portion of the machine shown in Fig. 4 and showing the head mounting in plan view.

In the form of the invention shown in Figs. 4 and 5 it is primarily adapted for use with a recording tape 38 having a pair of juxtaposed and parallel recording tracks for areas 39 thereon. This type of recording tape is commonly known as a binaural type tape and the sound indications are transmitted therefrom to different amplifiers for producing a highly desirable and natural reproduction of sound in a room. In the form of the invention shown in Figs. 4 and 5 the sound reproducing machine has a frame 40 upon which mounting posts 41 and 42 are secured in a fashion similar to that shown in Figs. 1–3. The mounting plate 29 is formed of rigid sheet material and is provided with an offset 43 intermediate the ends thereof for disposing the opposite end portions 44 and 45 in parallel and juxtaposed vertical planes.

Heads 46 and 47 are secured to the opposite end portions 44 and 45 of the mounting plate respectively and the heads 46 and 47 are offset in relation to each other and are in alignment with the different tracks 39 of the tape 38. In this form of the invention, a spacer 48 is secured to the end portion 45 of plate 29 in the desired position relative to the tape 38 and the posts 41 and 42. The opposite ends of the mounting plate 29 are secured to the posts 41 and 42 by means of screws 49, which in the form shown are provided with serrated heads for ready and easy manual gripping and turning. Each set of heads 46 and 47 may include an erasing head and a recording head so as to properly impress sound indications on the magnetic tracks of the tape.

Figure 7:
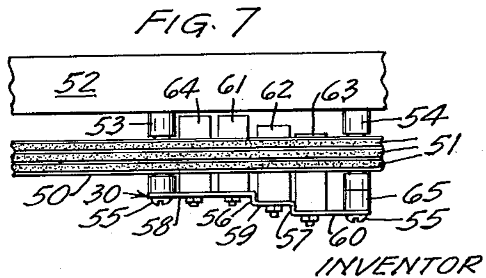
Fig. 7 is a detail plan view of a sound reproducing machine showing another modified form of the head mounting.

In the form of the invention shown in Fig. 7, the tape 50 is provided with three juxtaposed and parallel magnetic recording areas or tracks 51 for recording three different sound indications on the tape simultaneously. This tape 50 is known as a trinaural tape and is used with three separate transmitting heads and separate amplifiers.

This form of the sound reproducing machine includes a frame 52, a pair of spaced mounting posts 53 and 54 which are affixed to the frame 52 as previously described. A mounting plate 30 is secured on the posts 53 and 54 by screws 55 and the mounting plate 30 has two offset portions 56 and 57 intermediate the ends thereof to define three different head mounting areas which are disposed in three adjacent and parallel planes. The heads 61, 62 and 63 are mounted on the mounting areas 58, 59 and 60 in a manner previously described and are thereby disposed in alignment with the different tracks 51 of the tape 50 and out of alignment with each other.

An erasing head **64*a* may also be secured on the mounting plate 30 and adapted to erase all of the tracks of the tape simultaneously. A spacer 65 is disposed between the post 54 and the end portion 60 of plate 30** to properly orient the mounting plate with respect to the tape.

A single sound reproducing machine may be used with any of the different style tapes, including the binaural and trinaural tapes 38 and 50, provided the sound reproducing machine is provided with the necessary amplifiers by merely removing the mounting plate 28 along with its heads 25 and replacing it with the mounting plate 29 with the heads 46 and 47 thereon or with the mounting plate 30 having the heads 61–63 thereon. The heads will normally be affixed to the mounting plates in proper position for engaging the recording tape in a predetermined relation and when any of the head mounting plates is secured to the mounting posts, the heads will be aligned and in proper position for maximum operative efficiency in relation to the tape.

Figure 6:
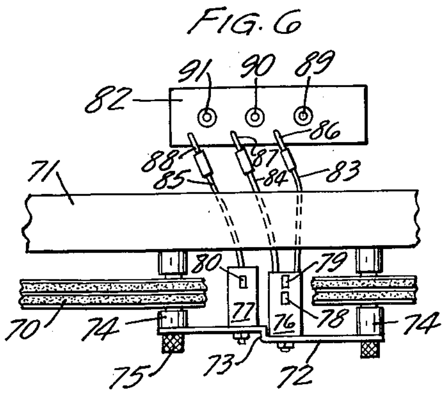
Fig. 6 is a detail plan view of a portion of a sound reproducing machine showing another modified form of head mounting.

In Fig. 6 is shown a head mounting arrangement primarily adapted for use in a sound reproducing machine of the type described, for adapting the machine to use binaural recording tapes 70 regardless as to whether the tapes be recorded in stacked relation or in staggered relation. The head mounting and arrangement facilitates the ready and easy interchangeable use of both types of tapes. The recording machine has a frame 71, a head mounting plate 72 similar to that shown in Fig. 5 with an offset 73 therein. The head mounting plate is mounted at its opposite ends on a pair of posts 74 by thumb screws 75 which extend through suitably provided apertures at the ends of the plate. A pair of heads 76 and 77 are mounted on the plate 72 in a manner similar to that previous described and are spaced from each other in a direction longitudinally of the tape 70. Head 76 has a pair of in-line electromagnetic elements 78 and 79 which are disposed in alignment with each other in a direction transversely of the tape 70. Head 77 has a single electromagnetic element 80 disposed in operative relation with one of the tracks of the tape 70. An amplifier input 82 is shown diagrammatically in Fig. 6 and it will be seen that means are provided for selectively and individually connecting each of the electromagnetic elements 78, 79 and 80 to the amplifier input 82. In the form shown, such means include a plurality of conductors 83, 84 and 85 which are respectively connected with elements 78, 79 and 80 and which are also provided with plugs 86, 87 and 88 on the ends thereof. Jacks 89, 90 and 91 are provided in the amplifier inputs 82 for respectively receiving the plugs 86, 87 and 88.

When the tape employed in the tape playing machine is recorded in stacked relation, plugs 86 and 87 are inserted into their corresponding jacks 89 and 90 so that the sound indications transmitted by element 78 and 79 are fed into the amplifier input. When this stacked tape is used, the head 77 and the element 80 thereof is inoperative.

When it is desired to use the tape playing machine with a binaural tape recording in staggered relation, plug 86 will be removed from its corresponding jack to render the element 79 inoperative and the plug 88 will be inserted into its corresponding jack so as to transmit sound signals from the element 80 to the amplifier. The sound indication transmitting elements 78 and 80 then cooperate for supplying the proper sound indications to the amplifier.

It will be seen that I have provided a new and improved head mounting for a sound reproducing machine which facilitates the rapid interchange of tranducer head arrangements and also facilitates rapid interchange of such heads during servicing of the machine.

It will, of course, be understood that various changes may be made in the form, details, arrangement and proportions of the parts without departing from the scope of our invention which consists of the matter shown and described herein and set forth in the appended claims.

What is claimed is:

1. In a sound reproducing machine employing an elongated flexible magnetic record element, a frame member along which the record element is moved, a pair of spaced mounting posts affixed to the frame member and extending transversely across the record element and on one side thereof, said posts having guiding recesses intermediate the ends thereof, said recesses carrying the record element therein and guiding the same in longitudinal movement, a rigid mounting plate carried on the outer ends of the posts, screw threaded means removably securing said plate on the posts, and said mounting plate having a plurality of electromagnetic transducer heads thereon and disposed between the posts and in alignment with the recesses for engaging the record element.

2. In a sound reproducing machine employing a magnetic record tape having a plurality of juxtaposed recorded signal tracks thereon, comprising a frame member along which the record element is moved, a pair of spaced and outwardly projecting mounting posts affixed to the frame member and extending transversely outwardly therefrom and across the record element, said post having outer ends, a rigid mounting plate having opposite end portions and having an intermediate portion, the opposite end portions of said plate being secured to the end portions of the posts, the intermediate portion of said plate having an offset therein whereby to dispose the plate end portions in adjacent planes, and a plurality of electromagnetic transducer heads secured on said plate in spaced relation with the offset and in opposite directions therefrom, said transmitting heads projecting inwardly toward the frame member from the plate and being disposed between the posts and each of said heads projecting into operative alignment with a different track on the record tape.

3. In a sound reproducing machine of the type employing a magnetic record tape having a plurality of juxtaposed recorded signal tracks thereon, comprising a frame member along which the record element is moved, a pair of spaced mounting members fixed to the frame and extending outwardly therefrom and across the record element, said mounting members having outer ends, a rigid mounting plate having opposite end portions and having an intermediate portion, the opposite end portions of said plate being secured to the ends of the mounting members, the intermediate portion of said plate having a plurality of spaced offsets therein whereby to dispose the plate end portions in adjacent planes and to define a plurality of head-mounting areas in spaced and substantially parallel planes, and a plurality of electromagnetic transducer heads secured to different mounting areas of said plate and extending transversely outwardly from the plate and the mounting areas whereby to be disposed in alignment with the juxtaposed recorded signal tracks on the record tape.

References Cited in the file of this patent

UNITED STATES PATENTS

| | | |
|---|---|---|
| 1,066,706 | Caine | July 8, 1913 |
| 2,560,569 | Hare | July 17, 1951 |
| 2,561,338 | Camras | July 24, 1951 |
| 2,580,819 | Nagy | Jan. 1, 1952 |
| 2,615,989 | Thad | Oct. 28, 1952 |
| 2,683,774 | Camras | July 13, 1954 |
| 2,728,577 | Barany et al. | Dec. 27, 1955 |
| 2,742,284 | Munroe | Apr. 17, 1956 |
| 2,862,715 | MacDonald | Dec. 2, 1958 |